June 25, 1929.  J. F. DOSTER  1,718,545

REBOUND CHECK

Filed Sept. 1, 1926

Inventor

J. F. Doster.

By Frease and Bond
Attorneys

Patented June 25, 1929.

1,718,545

UNITED STATES PATENT OFFICE.

JONATHAN FRANK DOSTER, OF BOWDIL, OHIO, ASSIGNOR, BY MESNE ASSIGNMENTS, TO HARVEY H. MILLER, OF CANTON, OHIO.

REBOUND CHECK.

Application filed September 1, 1926. Serial No. 132,950.

The invention relates to rebound checks or shock absorbers for motor vehicles; and the object of the improvement is to provide a rebound check adapted to be connected to the leaf springs of the vehicle to hold the leaves tightly together and prevent any undue rebound of the vehicle body; the device being so constructed that it is easily and readily adaptable to springs of different widths, whereby it may be quickly adjusted to fit upon the spring of any make of automobile; means being provided for quickly and easily adjusting, and holding in adjusted position, the coil spring of the device and for lubricating the leaf springs to which it is applied.

An embodiment of the invention is illustrated in the accompanying drawing, in which—

Figure 1:
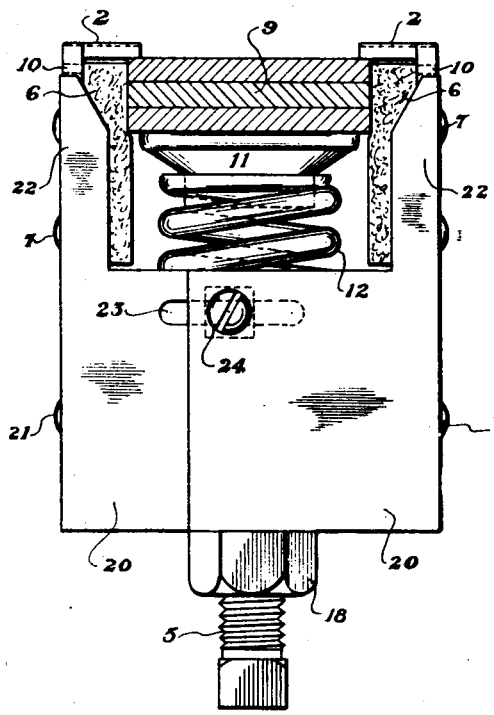
Figure 2:
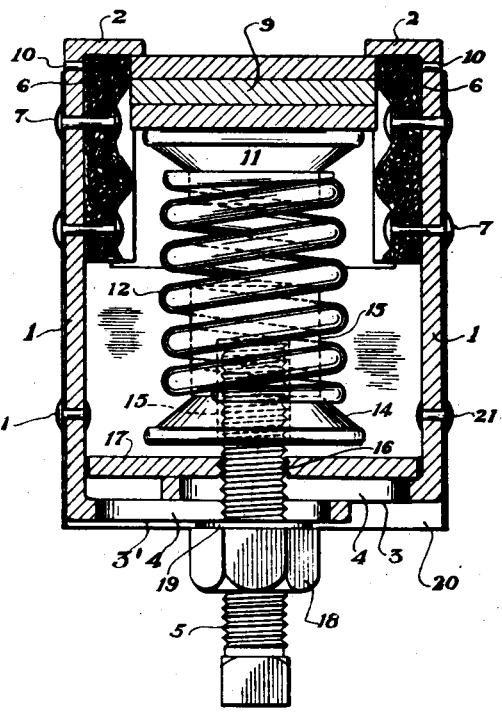

Figure 1 is a side elevation of the improved rebound check;

Fig. 2, a longitudinal sectional view through the same; and

Figure 3:
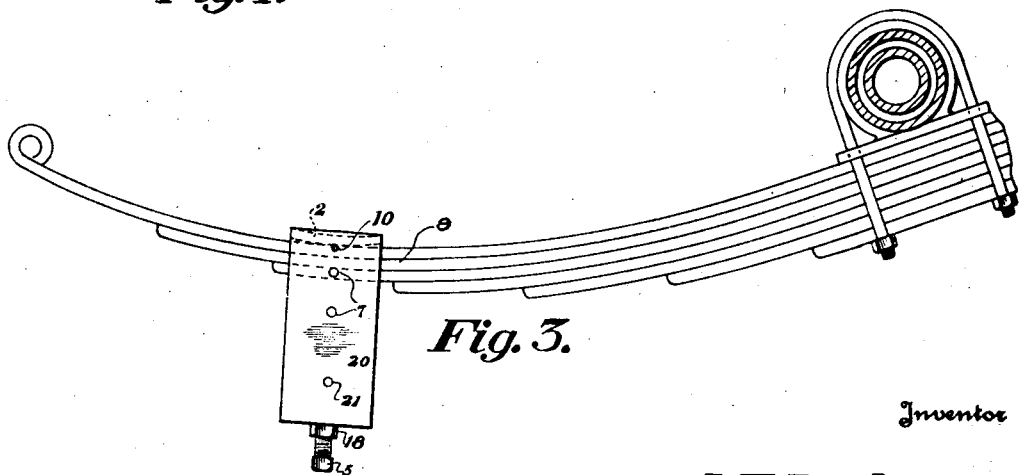

Fig. 3, a side elevation of a vehicle spring, showing the rebound check applied thereto.

Similar numerals of reference indicate corresponding parts throughout the figures of the drawings.

The device comprises a pair of substantially L-shaped frames 1, the upper ends of which may be provided with the short, inturned, half oval angular flanges 2 and the lower ends of which are provided with feet 3, 3'. It will be noted that one of the members 1 is shorter than the other, the purpose of which is to permit the feet 3, 3', to overlap each other when the frames or members 1 are assembled upon the opposite sides of and in operative relation to the spring 9. These frames are adapted to be adjusted toward and from each other, and for the purpose of this adjustment the foot portion 3 of each frame may be provided with an elongated slot 4, through which the adjusting screw 5 is located.

Felt pads 6 may be mounted on the inner faces of the frames, being preferably connected to the inner faces of the frame members 1, at the upper ends thereof as by rivets 7, these pads being arranged to engage opposite edges of the leaf springs 9 of the automobile.

In order to easily saturate these felt pads with oil, for the purpose of lubricating the leaf springs 9, an oil hole 10 may be provided in the upper end portion of each edge L-shaped frame 1, to permit the spout of an oil can to be inserted therein when it is necessary to lubricate the pads.

A head 11 is arranged to engage the underside of the leaf springs 9 and clamp the leaves together against the angular flanges 2 of the L-frames by the pressure of the coil spring 12.

For the purpose of compressing the spring 12, the cylindrical block 13 is extended into the lower end portion of the spring, the conical head 14 of the block engaging the lower end of the spring.

This block is provided with the socket 15, which receives the upper end portion of the adjusting screw 5, this screw being threaded through the tapped opening 16, in the plate 17, which rests upon the foot 3, the plate being pressed or forced against the foot by the tension of the spring.

In order to hold the adjusting screw in adjusted position a nut 18 is provided for engagement with the lower surface of the foot 3'. I may also interpose a lock washer 19 between the nut 18 and foot 3'. When the nut 18 is tightened against the foot 3' it locks the screw against turning and also clamps the feet 3, 3', and plate 17 together and thus prevents the feet from moving relatively to each other to maintain them in operative relation to the spring 9.

With this construction any desired tension may be placed upon the spring 12 to clamp the leaves 9 between the angle flanges 2 and the head 11.

A sheet metal case is provided for the device and preferably comprises two substantially channel shaped portions 20, one of which is connected to each L-frame as by the rivets 21 and 7.

A channel shaped extension 22 may be provided upon the upper portion of each part of the sheet metal case to act as a protection for the felt pads 6.

One of the case portions 20 is provided on each side with an elongated slot 23 to receive the bolt 24, threaded into an opening formed in the other member 20. The bolt 24 serves to hold the two members 1 and parts associated therewith in assembled relation until the device is mounted on a spring as shown in the drawings.

It will be noted that the inner surfaces of the flanges 2 are curved from side edge to side edge so that such surfaces have line contact with the adjacent spring leaf; whereas the head 11 lies flat against the adjacent leaf. This construction permits the device to bodily move about or fulcrum on the lines of contact between the flanges and the adjacent spring leaf, as relative movement between the spring leaves takes place.

From the foregoing description it will also be noted that I provide two separable members which have overlapping portions through which the adjusting screw extends and that the stationary member for the screw engages with the inner overlapping portion and the locking means for the screw engage with the other overlapping portion. As a result, when the locking means is tightened, it serves to lock the screw and also clamp the two overlapping portions together to prevent the separation of the two separable members. It will thus be seen that a single nut serves to lock the screw and secure the two members together in operative relation to the vehicle spring, thus simplifying the construction and operation of mounting the device upon the spring.

With this construction the device is quickly and readily adjustable to leaf springs of all widths as it is only necessary to loosen the bolts 24 and then place the device in position upon the leaf springs in Figs. 1 and 2, after which the bolts 24 are tightened and the screw 5 adjusted to place the proper tension upon the spring 12, the nut 18 being then tightened to hold the screw in adjusted position.

When this device is applied to the leaf springs of an automobile and the proper tension placed upon the coil spring 12, the leaves of the springs will be clamped tightly together preventing separation of the leaves and sudden rebounding of the leaf springs and automobile body, thus effectually snubbing the springs and causing the vehicle to ride smoothly and evenly even when passing over obstructions or ruts in the roadway.

I claim:

1. A rebound check for leaf springs, including a pair of L-shaped frame members, each of said frame members having an elongated slot in its foot portion, a spring carried by said frame member for clamping the leaves of a spring and an adjusting screw operatively engaging the spring and located through said slots.

2. A rebound check for leaf springs, including a pair of channel shaped casing members, means for adjusting said members toward and from each other, and resilient means carried in said casing members for clamping the leaves of a spring.

3. A rebound check for leaf springs, including a pair of channel shaped casing members, means for adjusting said casing members toward and from each other and a coil spring carried in said casing members for clamping the leaves of a leaf spring.

4. A rebound check for leaf springs, including a pair of channel shaped casing members, means for adjusting said members toward and from each other, a coil spring carried in said casing members for clamping the leaves of a leaf spring and an adjusting screw for adjusting the tension upon said coil spring.

5. A rebound check for leaf springs, including a pair of channel shaped casing members, a clamping bolt carried by one casing member, the other casing member having an elongated slot to receive said bolt, and means carried in said casing members for clamping the leaves of a leaf spring.

6. A rebound check for leaf springs, including a pair of channel shaped casing members, a clamping bolt carried by one casing member, the other casing member having an elongated slot to receive said bolt, and a coil spring carried in said casing members for clamping the leaves of a leaf spring.

7. A rebound check for leaf springs, including a pair of L-shaped frame members, each member having an inturned flange at its upper end and a slot in its foot portion, a coil spring carried by said frame members, a head engaging the upper end of the coil spring for clamping the leaves of a leaf spring against said inturned flanges, and an adjusting screw located through said slots for placing the coil spring under tension.

8. A rebound check for leaf springs, including a pair of L-shaped frame members, each member having an inturned flange at its upper end and a slot in its foot portion, a coil spring carried by said frame members, a head engaging the upper end of the coil spring for clamping the leaves of a leaf spring against said inturned flanges, an adjusting screw located through said slots and a block operatively engaging said screw and coil spring.

9. In a shock absorber, the combination of a pair of members having at one end flanges arranged to engage a leaf of a spring and at their other end overlapping portions, a plate engaging the inner portion, an adjusting screw mounted in said plate, a coiled spring between said screw and the adjacent leaf of the spring, and a single means for locking said screw and clamping said overlapping portions together.

10. In a shock absorber, the combination of a pair of members having at one end flanges arranged to engage a leaf of a vehicle spring and at their other end overlapping portions, a member engaging the inner overlapping portion and formed with a threaded opening, an adjusting screw extending through openings formed in said overlapping portions and mounted in said threaded opening, a coiled spring between said screw and the adjacent leaf of said vehicle spring, and a nut on said screw and arranged to be tightened against the outer overlapping portion to lock said screw and secure said portions together.

11. In a shock absorber, the combination of a pair of members arranged to be disposed upon the opposite sides of a vehicle spring, one of said members having a foot, an adjusting screw mounted on said foot, a spring arranged to be engaged by said screw and put under compression against a leaf of the vehicle spring, means for securing said members together in operative relation to the vehicle spring, and flanges carried by said members and arranged to engage a leaf of the vehicle spring and be clamped thereagainst by the compression of said spring, the engaging surfaces of said flanges being curved from side edge to side edge.

In testimony that I claim the above, I have hereunto subscribed my name.

JONATHAN FRANK DOSTER.